United States Patent
Chin

(10) Patent No.: US 9,667,815 B2
(45) Date of Patent: May 30, 2017

(54) INFORMATION PROCESSING SYSTEM, INFORMATION PROCESSING DEVICE, AND INFORMATION PROCESSING METHOD

(71) Applicant: Shukoh Chin, Kanagawa (JP)

(72) Inventor: Shukoh Chin, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/180,413

(22) Filed: Jun. 13, 2016

(65) Prior Publication Data

US 2016/0373592 A1 Dec. 22, 2016

(30) Foreign Application Priority Data

Jun. 22, 2015 (JP) .................................. 2015-124550
Mar. 29, 2016 (JP) .................................. 2016-065555

(51) Int. Cl.
G06F 15/00 (2006.01)
G06F 3/12 (2006.01)
G06K 1/00 (2006.01)
H04N 1/00 (2006.01)

(52) U.S. Cl.
CPC ....... H04N 1/0023 (2013.01); H04N 1/00204 (2013.01); H04N 1/00344 (2013.01); H04N 2201/0094 (2013.01)

(58) Field of Classification Search
CPC ............ H04N 1/0023; H04N 1/00344; H04N 1/00204; H04N 2201/0094
USPC ............................... 358/1.1, 1.15, 1.14, 1.13
See application file for complete search history.

(56) References Cited

U.S. PATENT DOCUMENTS

| 8,472,041 B2 | 6/2013 | Hakozaki | |
|---|---|---|---|
| 2007/0146778 A1 | 6/2007 | Kitagata et al. | |
| 2012/0036254 A1* | 2/2012 | Onuma | H04L 67/16 709/224 |
| 2015/0372911 A1* | 12/2015 | Yabusaki | H04L 67/34 709/226 |

FOREIGN PATENT DOCUMENTS

| JP | 2007-200284 | 8/2007 |
|---|---|---|
| JP | 2010-277524 | 12/2010 |
| JP | 2014-134978 | 7/2014 |

(Continued)

*Primary Examiner* — Douglas Tran
(74) *Attorney, Agent, or Firm* — IPUSA, PLLC

(57) ABSTRACT

A first information processing device includes a first registration unit to store, in a first storage unit, an identifier and destination information of a terminal; a receiver to receive, from the terminal, information including data identification information of data stored in the terminal, the identifier of the terminal, and user identification information of a user of the terminal; a second storage unit to store the information received by the receiver; a second registration unit to store, in a second information processing device, the user identification information and identification information of the first information processing device; a retrieval unit to retrieve, in response to a request from a data retrieval device, the information including the user identification information; and a transmitter to transmit the destination information and the data identification information. The data retrieval device retrieves the data based on the destination information.

9 Claims, 14 Drawing Sheets

(56) References Cited

FOREIGN PATENT DOCUMENTS

| | | |
|---|---|---|
| JP | 2014-228965 | 12/2014 |
| JP | 2015-095233 | 5/2015 |
| JP | 2016-063375 | 4/2016 |

* cited by examiner

FIG.6

| TERMINAL NAME | IP ADDRESS |
|---|---|
| CLIENT a | 133.139.xxx.xxx |
| ... | ... |
| : | : |

| JOB NAME | USER NAME | STORAGE DESTINATION |
|---|---|---|
| xxx.jpg | userA | CLIENT a |
| yyy | userA | BASE SERVER a |
| zzz | userA | CLIENT a |
| abc | userB | CLIENT b |

| BASE SERVER NAME | IP ADDRESS |
|---|---|
| BASE SERVER a | ... |
| BASE SERVER b | ... |
| BASE SERVER c | ... |

| JOB NAME | USER NAME | STORAGE DESTINATION | IP ADDRESS |
|---|---|---|---|
| xxx.jpg | userA | CLIENT a | 133.139.xxx.xxx |
| yyy | userA | PRINT SERVER a | ... |
| zzz | userA | CLIENT a | 133.139.xxx.xxx |

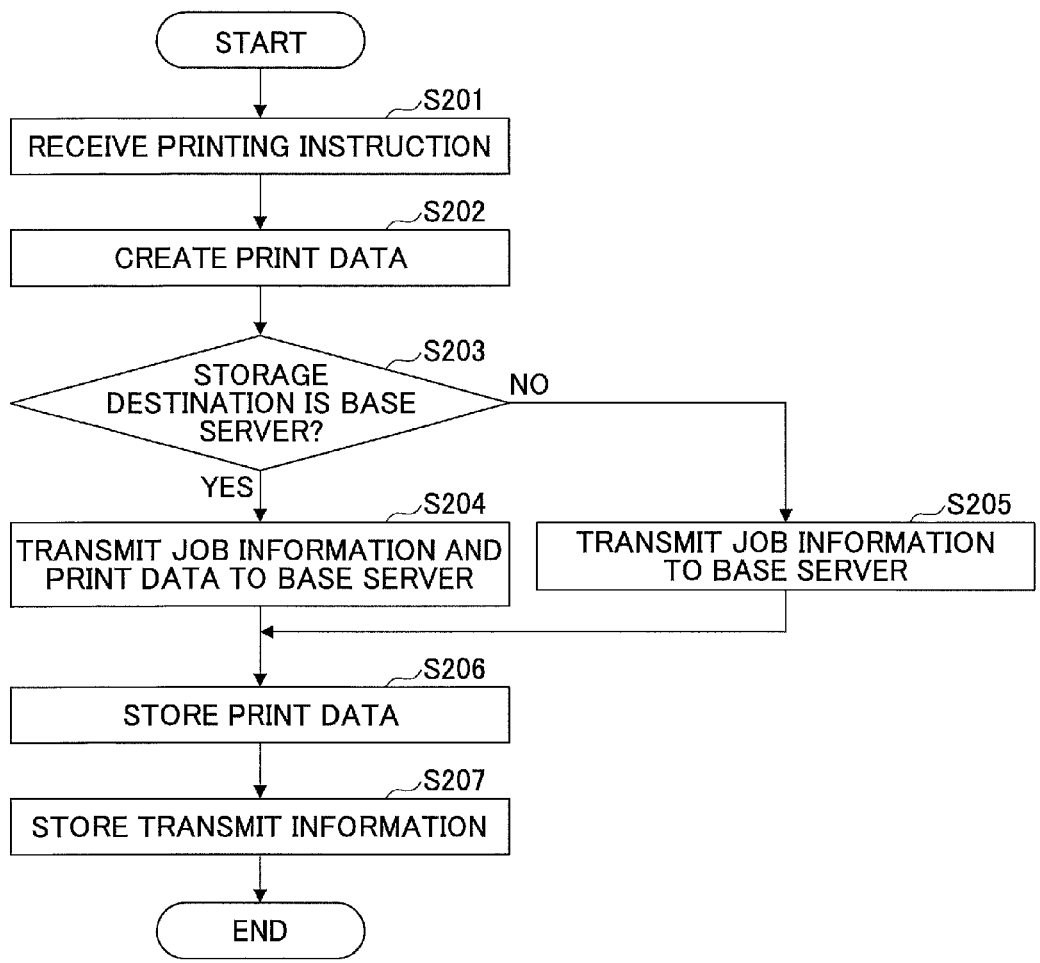

INFORMATION PROCESSING SYSTEM, INFORMATION PROCESSING DEVICE, AND INFORMATION PROCESSING METHOD

BACKGROUND OF THE INVENTION

1. Field of the Invention

The present invention relates to an information processing system, an information processing device, and an information processing method.

2. Description of the Related Art

A printing method has been known that is referred to as "pull-print printing." In the pull-print printing, print data of document data that is specified as a printing target by a user in a client terminal, such as a personal computer (PC), is stored in the client terminal or in a predetermined server. In response to an operation by the user to an image forming device, the image forming device obtains (pulls) the print data stored in the client device or in the predetermined server; and the image forming device executes a print job. For the pull-print printing, a situation can be prevented, such as a case in which a sheet on which confidential information is printed is left or confidential information is read by an unauthorized person, because the print job is executed when the user is in the vicinity of the image forming apparatus. In addition, according to the pull-print printing, a print job can be executed from any one of a plurality of image forming devices that can access the client terminal or the predetermined server.

[Patent Document 1] Japanese Unexamined Patent Publication No. 2007-200284

Here, a state in which the print data is stored in the client terminal is focused on. For a case of storing the print data in the client terminal, it is not efficient to register, to the image forming device, all client terminals from which the print data can be obtained. For example, in a company, each employee may have a terminal, which can be a client terminal; and a number of such terminals may increase or decrease relatively easily.

Thus, in the state in which the print data is stored in the client terminal, the pull-print printing is executed, for example, in the following procedure.

The client terminal that stores the print data transmits, to a predetermined server (which is referred to as the "print server," hereinafter), identification information of the print data. The print server stores information (which is referred to as the "job information," hereinafter) including the identification information and an IP address of the client terminal, which are associated in the information. Note that, for each print data stored in the client terminal, the job information is stored. An image forming device, which is specified as a target of operation, retrieves a list of the job information from the print server. The image forming device retrieves, from a client terminal corresponding to an IP address that is included in the job information selected by a user from the list, the print data corresponding to the identification information included in the job information. According to such a procedure, it is not required that an IP address of a client terminal is stored, in advance, in the image forming device.

In a company having a plurality of offices and/or branches (which is referred to as the "bases," hereinafter), it is possible that, for each base, a print server is installed, for example. Furthermore, it is possible that systems of IP addresses differ depending on the bases. For a case where a client terminal is a portable terminal, such as a laptop personal computer or a smart terminal, one client terminal may be used across the plurality of bases.

In such a case, a situation may occur such that print data that is stored in a client terminal while the client terminal is used in a base A may not be accessed from an image forming device after the client terminal has been moved to a base B.

Namely, in this case, in the print server in the base A, job information is stored that includes an IP address assigned to the client terminal in the base A. When an image forming device that is specified as an operation target attempts to obtain print data from the client terminal based on the IP address included in the job information retrieved from the print server in the base A, another IP address is assigned to the client terminal in the base B, so that the image forming device may not access the client terminal.

It is desirable that, even if address information of a device, which is a storage destination of data, is changed, the data can be obtained from the storage.

SUMMARY OF THE INVENTION

According to an aspect of the present invention, there is provided an information processing system including a plurality of first information processing devices; and a second information processing device that is connected to the plurality of the first information processing devices through a first network, wherein each of the plurality of first information processing devices includes a first registration unit configured to store, in a first storage unit, an identifier of a terminal and destination information of the terminal while associating the identifier with the destination information, the identifier and the destination information being transmitted from the terminal that is connected to the first information processing device through the network; a receiver configured to receive, from the terminal, information including data identification information of data stored in the terminal, the identifier of the terminal, and user identification information of a user of the terminal; a second storage unit configured to store the information received by the receiver; a second registration unit configured to store, in the second information processing device, the user identification information received by the receiver and first information processing device identification information of the first information processing device, while associating the user identification information with the first information processing device identification information; a retrieval unit configured to retrieve, in response to a request from a data retrieval device, the information including the user identification information of the user from the second storage unit of the first information processing device corresponding to the first information processing device identification information that is stored in the second information processing device while associated with the user identification information of the user of the data retrieval device; and a transmitter configured to transmit, for each of the retrieved information, the destination information stored in the first storage unit, the destination information being associated with the identifier included in the information, and the data identification information included in the information to the data retrieval device, and wherein the data retrieval device is configured to retrieve the data based on the destination information.

According to another aspect of the present invention, there is provided a first information processing device of a plurality of first information processing devices connected to a second information processing device through a network, the first information processing device including a first registration unit configured to store, in a first storage unit, an identifier of a terminal and destination information of the terminal while associating the identifier with the destination information, the identifier and the destination information being transmitted from the terminal that is connected to the first information processing device through the network; a receiver configured to receive, from the terminal, information including data identification information of data stored in the terminal, the identifier of the terminal, and user identification information of a user of the terminal; a second storage unit configured to store the information received by the receiver; a second registration unit configured to store, in the second information processing device, the user identification information received by the receiver and first information processing device identification information of the first information processing device, while associating the user identification information with the first information processing device identification information; a retrieval unit configured to retrieve, in response to a request from a data retrieval device, the information including the user identification information of the user from the second storage unit of the first information processing device corresponding to the first information processing device identification information that is stored in the second information processing device while associated with the user identification information of the user of the data retrieval device; and a transmitter configured to transmit, for each of the retrieved information, the destination information stored in the first storage unit, the destination information being associated with the identifier included in the information, and the data identification information included in the information to the data retrieval device, wherein the data retrieval device is configured to retrieve the data based on the destination information.

According to another aspect of the present invention, there is provided an information processing method to be executed by a first information processing device of a plurality of first information processing devices connected to a second information processing device through a network, the information processing method including a first registration process of storing, in a first storage unit, an identifier of a terminal and destination information of the terminal while associating the identifier with the destination information, the identifier and the destination information being transmitted from the terminal that is connected to the first information processing device through the network; a receiving process of receiving, from the terminal, information including data identification information of data stored in the terminal, the identifier of the terminal, and user identification information of a user of the terminal; a storing process of storing, in a second storage unit, the information received by the receiving process; a second registration process of storing, in the second information processing device, the user identification information received by the receiving process and first information processing device identification information of the first information processing device, while associating the user identification information with the first information processing device identification information; a retrieval process of retrieving, in response to a request from a data retrieval device, the information including the user identification information of the user from the second storage unit of the first information processing device corresponding to the first information processing device identification information that is stored in the second information processing device while associated with the user identification information of the user of the data retrieval device; and a transmit process of transmitting, for each of the retrieved information, the destination information stored in the first storage unit, the destination information being associated with the identifier included in the information, and the data identification information included in the information to the data retrieval device, and wherein the data retrieval device retrieves the data based on the destination information.

According to the embodiment, even if address information of a device, which is a storage destination of data, is changed, the data can be obtained from the storage.

Other objects, features and advantages of the present invention will become more apparent from the following detailed description when read in conjunction with the accompanying drawings.

BRIEF DESCRIPTION OF THE DRAWINGS

FIG. 6 is a diagram illustrating an example of a configuration of a client information storage unit;

FIG. 7 is a diagram illustrating an example of a configuration of a job information storage unit;

FIG. 12 is a diagram illustrating an example of a configuration of a base server list storage unit;

FIG. 13 is a diagram illustrating an example of a job list;

FIG. 15 is a flowchart illustrating an example, in the embodiment, of a process to be executed by a client in response to a printing instruction;

FIG. 16 is a diagram illustrating an example of a configuration of a transmit information storage unit;

DETAILED DESCRIPTION OF THE PREFERRED EMBODIMENTS

Figure 1:
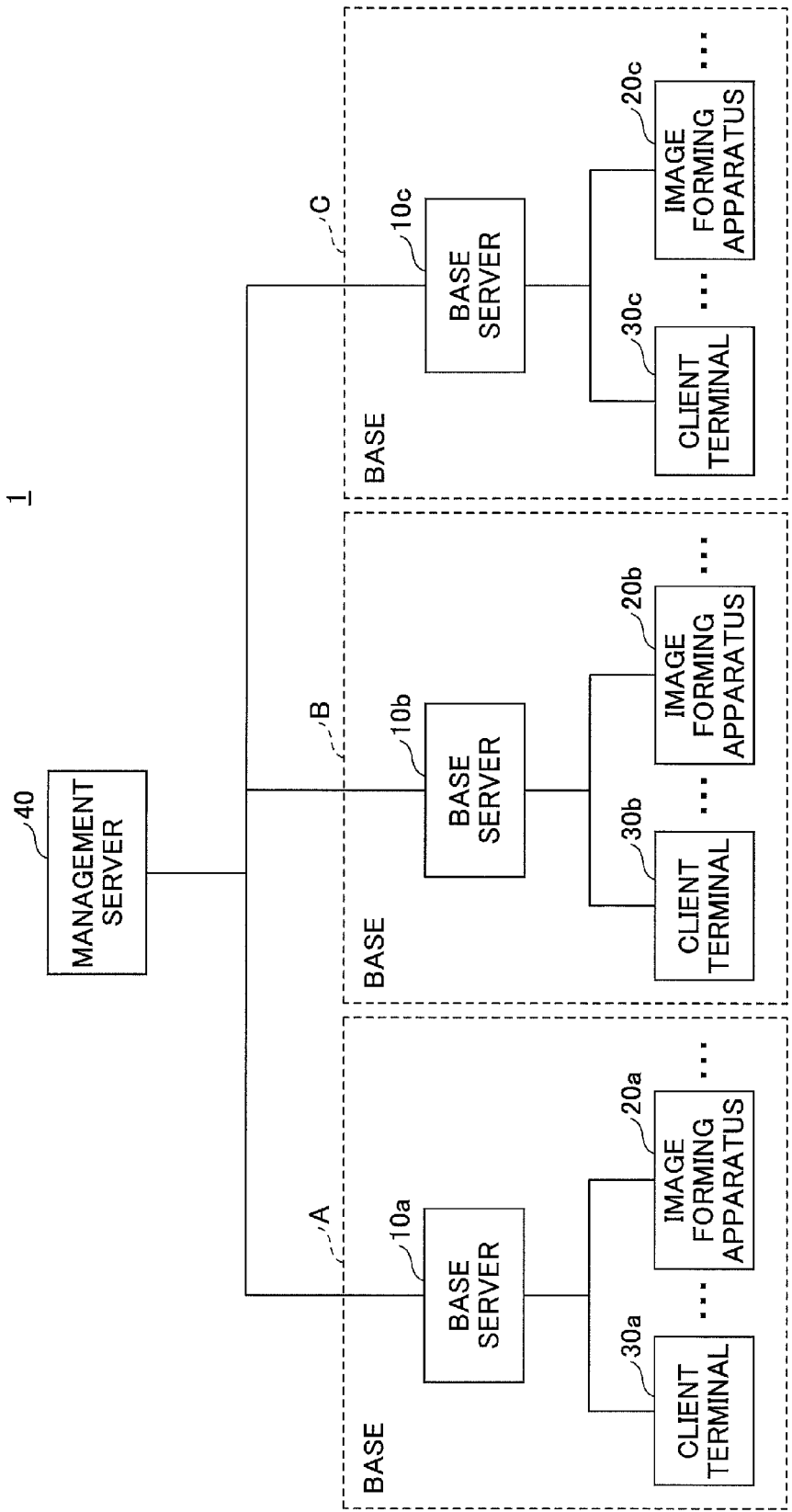
FIG. 1 is a diagram illustrating an example of a configuration of a printing system according to an embodiment.

An embodiment of the present invention is described below by referring to the drawings. FIG. 1 is a diagram illustrating an example of a configuration of a printing system according to the embodiment.

In a printing system 1 illustrated in FIG. 1, each base, such as a base A, a base B, and a base C, is a base of activities, such as a work place or an office of a company. For example, the base A may be a base in an area A; the base B may be a base in an area B; and the base C may be a base in an area C. The areas A to C may be different prefectures, or different countries. Furthermore, there may be four or more bases. Here, "a" is attached to the end of each of the reference numerals of the devices that belong to the base A; "b" is attached to the end of each of the reference numerals of the devices that belong to the base B; and "c" is attached to the end of each of the reference numerals of the devices that belong to the base C. However, when the devices that belong to the base A, the devices that belong to the base B, and the devices that belong to the base C are not distinguished, "a," "b," and "c" at the ends of the reference numerals may be omitted.

Each base may include a base server 10; one or more client terminals 30; and one or more image forming apparatuses 20. The base server 10, the one or more client terminals 30, and the one or more image forming apparatuses 20 are connected through a network, such as a local area network (LAN) or the Internet, so that the base server 10, the one or more client terminals 30, and the one or more image forming apparatuses 20 can communicate with each other through the network. Namely, each base server 10 corresponds to the image forming apparatus 20, which differs depending on the base server 10.

The client terminals 30 are, for example, terminals that are used by respective users who work at the bases. For example, a laptop PC may be used as the client terminal 30. In the embodiment, the client terminal 30 receives a printing instruction for printing document data from a user. The client terminal 30 creates print data for the document data, which is a target of the printing instruction; and the client terminal 30 transmits, to the base server 10 that belongs to a base that is the same as the base to which the client terminal 30 belongs, identification information of a user of the client terminal 30 (which is referred to as a "user name," hereinafter); identification information of the print data; an identifier of the client terminal 30 (which is referred to as a "terminal name," hereinafter), and so forth. In response to detecting, in the printing instruction, that the base server 10 is specified as a storage destination of the print data, the client terminal 30 also transmits the print data to the base server 10. Whereas, in response to detecting, in the printing instruction, that the client terminal 30 is specified as a storage destination of the print data, the client terminal 30 stores the print data, without transmitting the print data to the base server 10.

Note that the terminal name is identification information that is invariant, even if a base to which the client terminal 30 belongs is switched. In contrast, an IP address of the client terminal 30 can be varied, depending on a base to which the client terminal 30 belongs. For example, the bases have mutually different systems of IP addresses; and, in each base, a corresponding IP address is assigned to the client terminal 30.

Furthermore, the print data is used for rendering a print image during execution of a print job, such as data in a page description language (PDL) format.

The base server 10 stores, for each print data, information (which is referred to as the "job information," hereinafter) including the user name and identification information of the print data, which is transmitted from the client terminal 30.

Further, in response to detecting that print data is transmitted from the client terminal 30, the base server 10 also stores the print data. The job information includes information indicating a storage destination of the print data. For example, if a storage destination of the print data is the base server 10, a value of the information is a value indicating the base server 10. Whereas, if the storage destination of the print data is the client terminal 30, the value of the information is the terminal name of the client terminal 30. In the embodiment, for one base, one base server 10 is installed. However, for one base, a plurality of base servers 10 may be installed.

The image forming apparatus 20 is a device including a printing function, such as a multifunction peripheral or a printer. In response to an operation by a user, the image forming apparatus 20 transmits a retrieval request for retrieving job information to the base server 10, which belongs to a base that is the same as the base to which the image forming apparatus 20 belongs. The image forming apparatus 20 retrieves, from the job information returned in response to the retrieval request, print data corresponding to the job information, based, for example, on the information indicating a storage destination included in the job information selected by the user. In each image forming apparatus 20, address information of the base server 10, which belongs to a base that is the same as the base to which the image forming apparatus 20 belongs, is set in advance, as a retrieval destination for retrieving the job information.

A management server 40 is a computer that is connected to the base servers 10 of the corresponding bases through a network, such as the Internet or a local area network (LAN), so that the management server 40 can communicate with the base servers 10. The management server 40 executes, for the job information and/or the print data, a process for implementing distribution over the base servers 10. For example, the management server 40 executes a process for enabling execution, by the image forming apparatus 20a of the base A, of a print job based on print data stored in the base server 10b or the client terminal 30b of the base B.

Note that the management server 40 may not be uniquely installed. For example, for each set of a predetermined number of the bases, one management server 40 may be installed. Additionally, the management server 40 may belong to any one of the bases. For example, any one of the base servers 10 may function as the management server 40.

Figure 2:
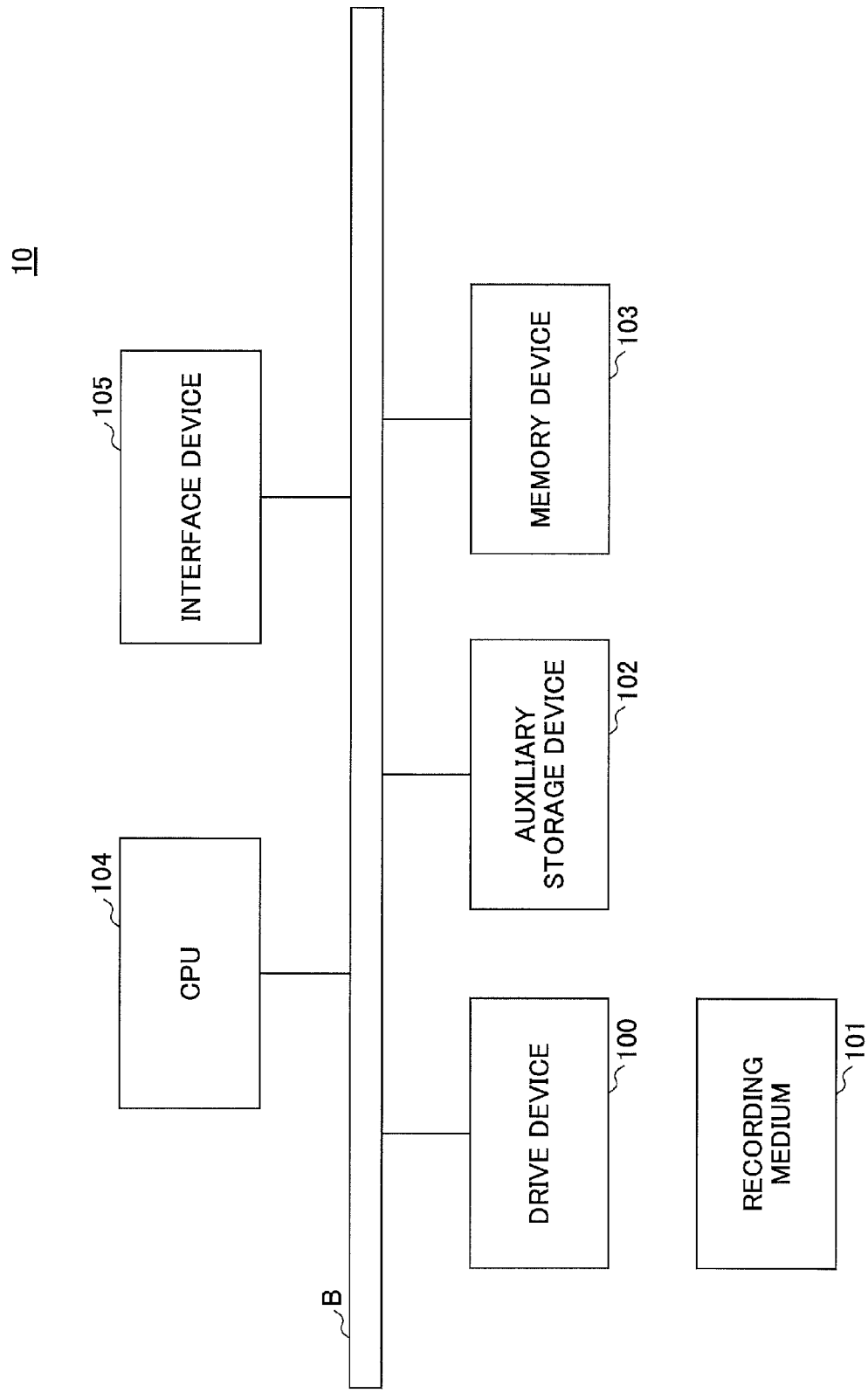
FIG. 2 is a diagram illustrating an example of a hardware configuration of a base server according to the embodiment.

The base server 10 of FIG. 2 includes, for example, a drive device 100; an auxiliary storage device 102; a memory device 103; a CPU 104; and an interface device 105, which are mutually connected through a bus B.

A program for executing a process at the base server 10 can be provided by a recording medium 101, such as a CD-ROM. Upon the recording medium 101 storing a program being set in the drive device 100, the program is installed in the auxiliary storage device 102 from the recording medium 101 through the drive device 100. However, it is not required that installation of the program is executed by using the recording medium 101; and the program may be downloaded from another computer through a network. The auxiliary storage device 102 may store an installed program, and the auxiliary storage device 102 may store necessary files and data, for example.

In response to detecting an instruction for activating a program, the memory device 103 reads out the program from the auxiliary storage device 102, and the memory device 103 stores the program. The CPU 104 executes functions of the base server 10 in accordance with the program stored in the memory device 103. The interface device 105 can be used as an interface for connecting to a network.

Note that each base server 10 may be implemented by a plurality of computers, each of which has a configuration illustrated in FIG. 2. Additionally, the management server 40 may have a hardware configuration, which is the same as the hardware configuration of the base server 10.

Figure 3:
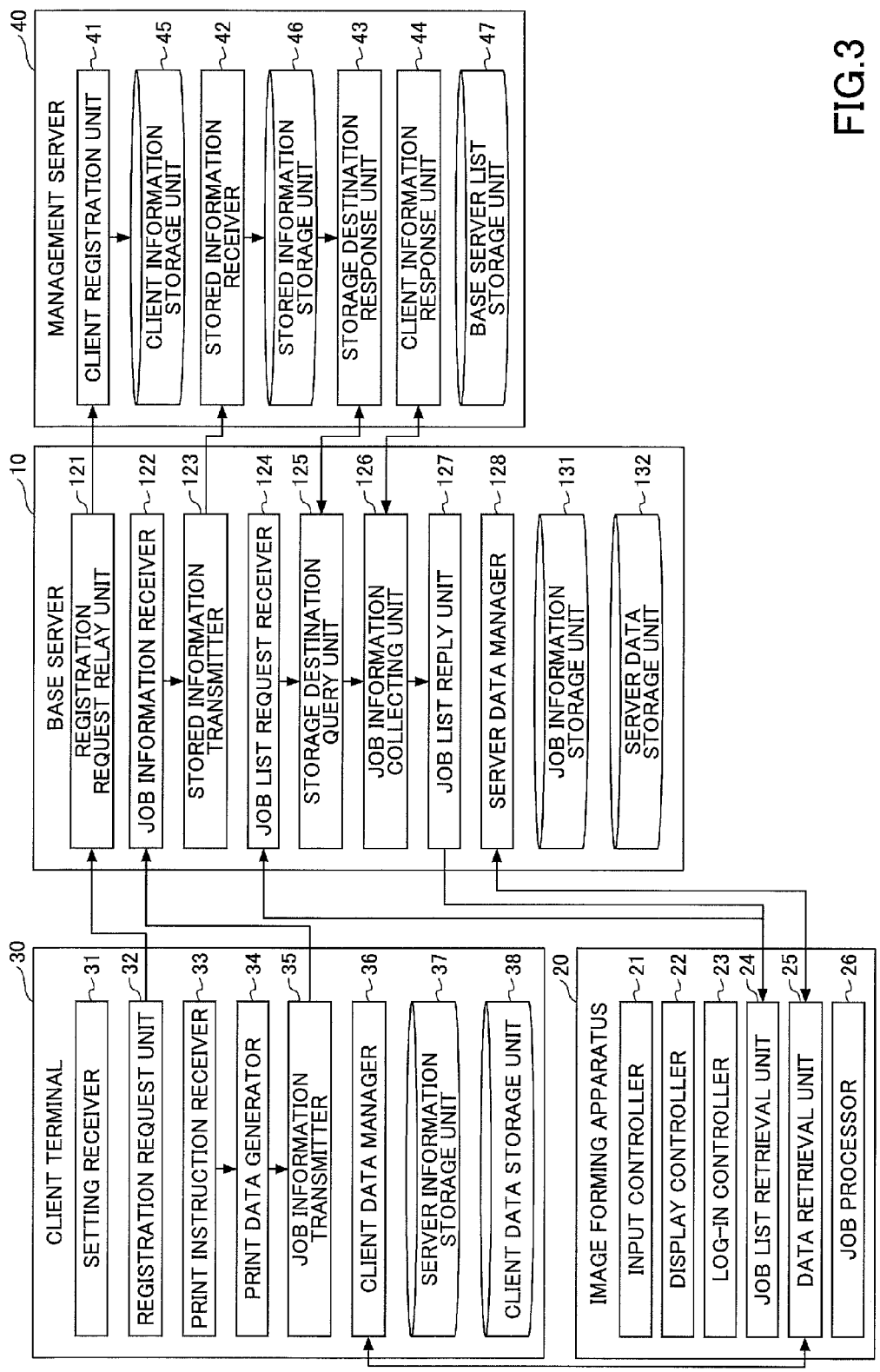
FIG. 3 is a diagram illustrating an example of a functional configuration of the printing system according to the embodiment.

FIG. 3 is a diagram illustrating an example of a functional configuration of the printing system according to the embodiment. As illustrated in FIG. 3, the client terminal 30 includes, for example, a setting receiver 31; a registration request unit 32; a print instruction receiver 33; a print data generator 34; a job information transmitter 35; and a client data manager 36. Each of the above-described units can be implemented by a process that is caused to be executed by the CPU of the client terminal 30 by one or more programs installed in the client terminal 30. Additionally, the client terminal 30 includes, for example, a server information storage unit 37; and a client data storage unit 38. Each of these storage units may be implemented by using, for example, an auxiliary storage device of the client terminal 30.

The setting receiver 31 receives, from a user, an input of setting information for causing the printing system 1 to be available. Specifically, identification information of the base server 10 (which is referred to as the "server information," hereinafter) of the base to which the client terminal 30 belongs is input as the setting information. The setting receiver 31 stores the received server information in the server information storage unit 37. Note that, as an example of the server information, there is an IP address of the base server 10.

In response to an operation by a user, for example, the registration request unit 32 transmits, to the base server corresponding to the server information stored in the server information storage unit 37, a registration request for requesting a terminal name and an IP address of the client terminal 30.

The print instruction receiver 33 receives, from a user, a print instruction for printing document data stored in the client terminal 30 or document data that is currently edited in the client terminal 30, for example. In the print instruction, a storage destination for storing print data, which is generated with respect to the document data, is also specified.

The print data generator 34 generates print data with respect to the document data that is specified as a printing target in the printing instruction.

The job information transmitter 35 transmits, to the base server 10 corresponding to the server information stored in the server information storage unit 37, job information including, for example, identification information for identifying the print data generated by the print data generator 34 (which is referred to as a "job name," hereinafter); a log-in user name of the client terminal 30; and a terminal name of the client terminal 30. In response to detecting that the base server 10 is specified as a storage destination for storing the print data, the job information transmitter 35 transmits the print data to the base server 10. Whereas, in response to detecting that the client terminal 30 is specified as a storage destination for storing the print data, the job information transmitter 35 stores the print data in the client data storage unit 38.

In response to a retrieval request for retrieving the print data from the image forming apparatus 20, the client data manager 36 obtains the print data from the client data storage unit 38. The client data manager 36 returns the retrieved print data to the image forming apparatus 20, which is the sender of the retrieval request.

The base server 10 includes, for example, a registration request unit 121; a job information receiver 122; a stored information transmitter 123; a job list request receiver 124; a storage destination query unit 125; a job information collecting unit 126; a job list reply unit 127; and a server data manager 128. Each of the above-described units can be implemented by a process that is caused to be executed by the CPU 104 by one or more programs installed in the base server 10. The base server 10 also includes, for example, a job information storage unit 131 and a server data storage unit 132. Each of these storage units can be implemented by using the auxiliary storage device 102, for example. Alternatively, each of these storage units may be implemented by using a storage device that is connected to the base server 10 through a network.

The registration request relay unit 121 receives registration request to request registration of a terminal name and an IP address of the client terminal 30, which are transmitted by the registration request unit 32 of the client terminal 30; and the registration request relay unit 121 transfers the registration request to the management server 40.

The job information receiver 122 receives job information transmitted from the client terminal 30. The job information receiver 122 stores the received job information in the job information storage unit 131. In response to detecting that the print data is received from the client terminal 30, the job information receiver 122 associates the print data with the job information, and the job information receiver 122 stores the print data and the associated job information in the server data storage unit 132.

The stored information transmitter 123 transmits, to the management server 40, a user name of a user corresponding to the job information received by the job information receiver 123, and the identification information of the base server 10 (which is referred to as the "base server name," hereinafter). Namely, the stored information transmitter 123 reports to the management server 40 that the job information of the user corresponding to the user name is stored in the base server 10. Hereinafter, the information reported by the stored information transmitter 123 is referred to as the "stored information."

The job list request receiver 124 receives, from the image forming apparatus 20, a retrieval request for retrieving a list of the job information (which is referred to as a "job list," hereinafter) corresponding to a user who logs in to the image forming apparatus 20. The storage destination query unit 125 queries the management server 40 as to the base server 10 that is the storage destination of the job information corresponding to the user who issues the retrieval request for retrieving the job list. Namely, the management server 40 can identify the base station server 10 storing the job information corresponding to each user, based on the stored information received from each base server 10. The job information collecting unit 126 collects, from the base server 10 or from another base server 10, the job information corresponding to the user who issues the retrieval request for retrieving the job list, based on a result of the query by the storage destination query unit 125. The job list reply unit 127 returns the job list collected by the job list collecting unit 126 to the image forming apparatus 20, which is the sender of the retrieval request for retrieving the job list. In response to a retrieval request for retrieving print data corresponding to the job information selected from the job list, the server data manager 128 retrieves the print data from the server data storage unit 132. The server data manager 128 returns the retrieved print data to the image forming apparatus 20, which is the sender of the retrieval request.

The management server 40 includes, for example, a client registration unit 41; a stored information receiver 42; a storage destination response unit 43; and a client information response unit 44. Each of the above-described units can be implemented by a process that is caused to be executed by the CPU of the management server 40 by one or more programs installed in the management server 40. Additionally, the management server 40 includes, for example, a client information storage unit 45; a stored information storage unit 46; and a base server list storage unit 47. Each of these storage units can be implemented, for example, by using the auxiliary storage device included in the management server 40. Alternatively, these storage units may be implemented by using a storage device that is connected to the management server 40 through a network.

The client registration unit 41 receives a registration request for registering the terminal name and the IP address of the client terminal 30, which is relayed by the base server 10; the client registration unit 41 associates the terminal name with the IP address; and the client registration unit 41 stores the terminal name and the associated IP address in the client information storage unit 45. Namely, the management server 40 centrally manages, for each client terminal 30, the terminal name and the IP address.

The stored information receiver 42 receives the stored information transmitted from the stored information transmitter 123 of each base server 10. The stored information receiver 42 stores the received stored information in the stored information storage unit 46. Thus, the stored information storage unit 46 associates the user name with the base server name of the base server 10 that is the storage destination of the job information for the user corresponding to the user name; and the stored information storage unit 46 stores the user name and the associated base server name.

In response to a query request from the storage destination query unit 125 of each base server 10, the storage destination response unit 43 returns a list of the base server names that are associated with the user name included in the query request and that are stored in the stored information storage unit 46.

In response to a retrieval request, which is transmitted from the job information collecting unit 126 of each base server 10, for retrieving the IP address of the client terminal 30, the client information response unit 44 returns the IP address that is associated with the terminal name included in the retrieval request and that is stored in the client information storage unit 45.

For each base server 10, the base server list storage unit 47 associates the base server name with the IP address, and the base server list storage unit 47 stores the base server name and the associated IP address.

The image forming apparatus 20 includes, for example, an input controller 21; a display controller 22; a log-in controller 23; a job list retrieval unit 24; a data retrieval unit 25; and a job processor 26. Each of the above-described units can be implemented by a process that is caused to be executed by the CPU of the image forming apparatus 20 by one or more programs installed in the image forming apparatus 20.

The input controller 21 parses, for example, an instruction by a user, which is input through an operation panel included in the image forming apparatus 20. The display controller 22 causes the operation panel to display information generated in progress of a process executed by the image forming apparatus 20. The log-in controller 23 controls a log-in process by a user with respect to the image forming apparatus 20.

The job list retrieval unit 24 retrieves a job list corresponding to a log-in user from the base server 10 that is set to be a reference destination in the image forming apparatus 20.

The data retrieval unit 25 retrieves the print data corresponding to the job information, which is selected by a user in the job lists displayed on the operation panel. The job processor 26 controls printing of the print data, which is retrieved by the data retrieval unit 25.

Figure 4:
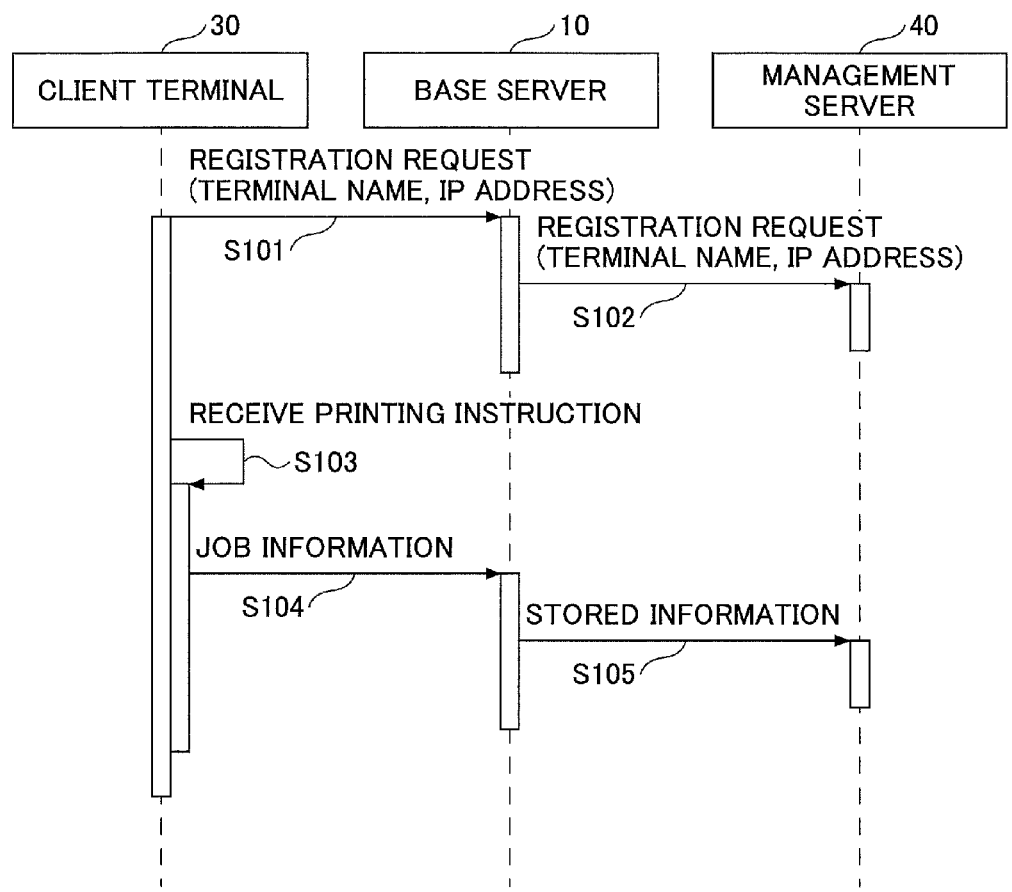
FIG. 4 is a sequence diagram illustrating an example of a procedure executed in response to a printing instruction.

A procedure of a process to be executed in the printing system 1 is described below. FIG. 4 is a sequence diagram illustrating an example of the procedure of the process to be executed in response to the printing instruction.

First, prior to inputting a printing instruction, a user inputs a registration instruction for registering the client terminal 30 to the client terminal 30. The registration request unit 32 of the client terminal 30 transmits, to the base server 10 corresponding to the server information stored in the server information storage unit 37, a registration request including the terminal name and the IP address of the client terminal 30 (S101).

Figure 5:
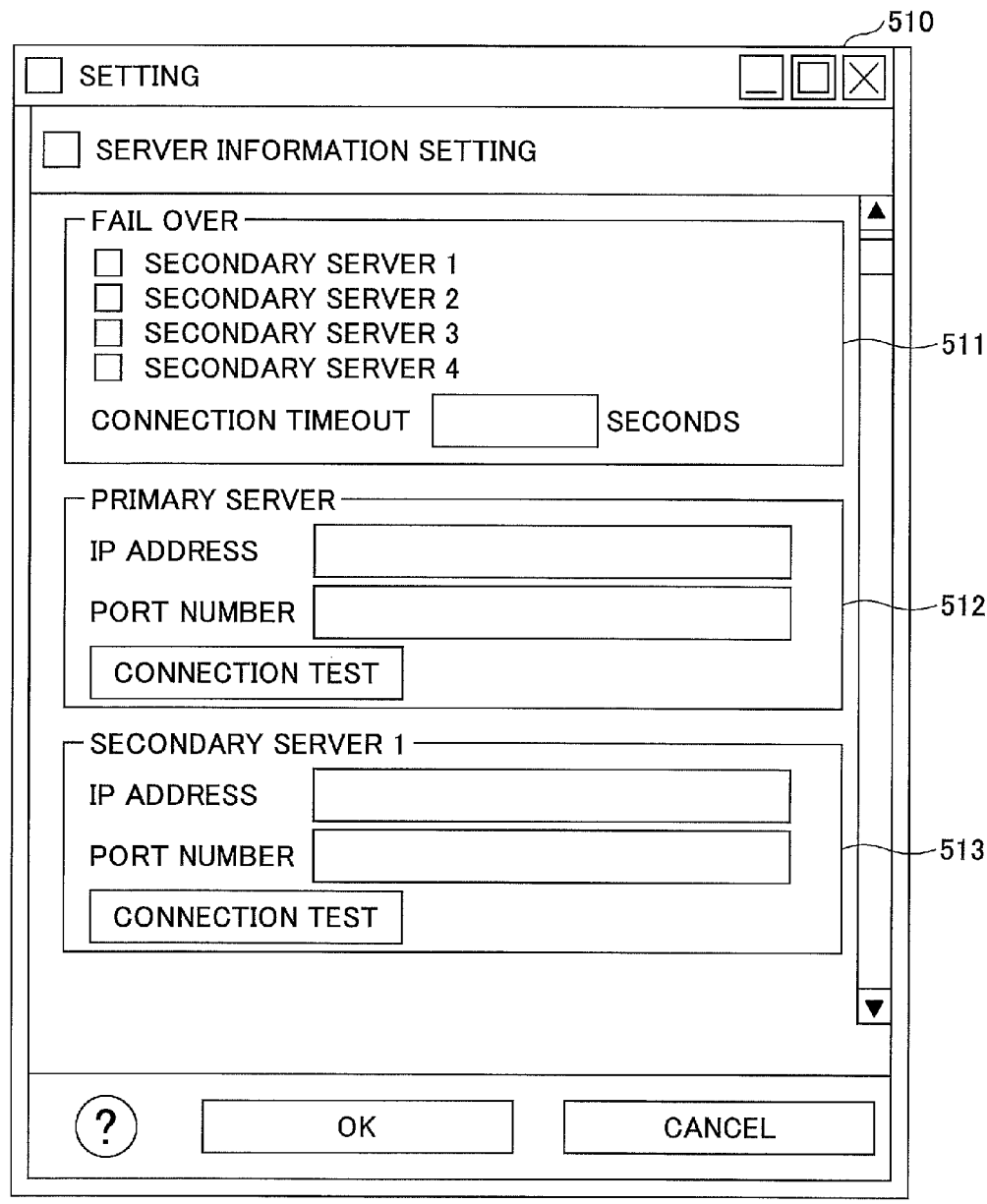
FIG. 5 is a diagram illustrating a display example of a server information setting screen.

Note that, for example, the server information is set, in advance, in the client terminal 30 through a server information setting screen illustrated in FIG. 5, and the server information is stored in the server information storage unit 37.

FIG. 5 is a diagram illustrating a display example of the server information setting screen. In FIG. 5, the server information setting screen 510 includes, for example, a region 511; a region 512; and a region 513.

The region 511 includes a check box for setting a secondary server of the base server 10, which is to be enabled during a fail over operation. Upon the check box being checked that is for setting the secondary server to be enabled during the fail over operation, a setting field for the selected secondary server is enabled.

Additionally, the region 511 includes an edit box for setting a time period for waiting, by the client terminal 30, for a response from the base server 10, which is a primary server, as a connection timeout. The region 512 includes an edit box for setting an IP address or a host name of the primary server of the base server 10; and an edit box for setting a port number. The region 513 includes an edit box for setting an IP address or a host name of the secondary server of the base server 10; and an edit box for setting a port number. Additionally, each of the region 512 and the region 513 includes a connection test button for confirming a connection to the base server 10 by using the selected IP address or the host name, and the selected port number.

Note that, in the above description, an example is described where there is the secondary server for the base server 10; however, the secondary server may not be installed. In this case, setting for the secondary server is not required.

Upon receiving the registration request, the registration request relay unit 121 of the base server 10 transfers the registration request to the management server 40 (S102). Note that, in each base server 10, the IP address and so forth of the management server 40 are set in advance.

Upon receiving the registration request, the client registration unit 41 of the management server 40 associates the terminal name with the IP address, which are included in the registration request; and the client registration unit 41 of the management server 40 stores the terminal name and the associated IP address in the client information storage unit 45.

FIG. 6 is a diagram illustrating an example of a configuration of the client information storage unit 45. As illustrated in FIG. 6, in the client information storage unit 45, the terminal name and the IP address of each client terminal 30 are associated and stored.

In response to detecting that a record corresponding to the terminal name included in the registration request has already been stored in the client information storage unit 45, the client registration unit 41 of the management server 40 updates the IP address stored in the record with the IP address included in the registration request. Consequently, upon the base to which a client terminal 30 belongs being switched, an IP address that is assigned to the client terminal 30 at the base after switching is stored in the client information storage unit 45, while the IP address is associated with the terminal name of the client terminal 30.

Note that step S101 is executed prior to a printing instruction being input to the client terminal 30 for the first time in a base. Namely, step S101 is executed each time the base server 10 that is the connection destination of the client terminal 30 is switched. For example, in response to detecting that setting of the server information is updated, step S101 may be automatically executed. Additionally, upon receiving, by the client terminal 30, a printing instruction for the first time at a base, the registration request unit 32 may automatically execute step S101. For example, based on whether the printing instruction is for the first time after the IP address assigned to the client terminal 30 is switched, a determination may be made as to whether the printing instruction is for the first time at a base.

Subsequently, upon receiving, by the print instruction receiver 33 of the client terminal 30, a printing instruction for printing specific document data, as a printing target (S103), the print data generator 34 creates print date for the document data. Subsequently, the job information transmitter 35 transmits, to the base server 10 corresponding to the server information stored in the server information storage unit 37, the job information of the print data (S104). Upon receiving the job information, the job information receiver 122 of the base server 10 stores the job information in the job information storage unit 131.

FIG. 7 is a diagram illustrating an example of a configuration of the job information storage unit 131. In FIG. 7, the job information storage unit 131 stores, for each print data, a job name, a user name, and a storage destination, for example. The job name is identification information of the print data. The user name is a name of a user who inputs the printing instruction corresponding to the print data. The storage destination is identification information for identifying the storage destination of the print data. When the storage destination of the print data is the client terminal 30, the value of the storage destination is the terminal name of the client terminal 30. When the storage destination of the print data is the base server 10, the value of the storage destination is the base server name of the base server 10.

Note that, when the storage destination is the base server 10, the job information transmitter 35 transmits the job information together with the print data to the base server 10 at step S104. The job information receiver 122 of the base server 10 associates the print data with the job name, for example; and the job information receiver 122 of the base server 10 stores the print data and the associated job name in the server data storage unit 132.

Subsequently, the stored information transmitter 123 of the base server 10 transmits, to the management server 40, the stored information including the user name corresponding to the job information and the base server name of the base server 10 (S105). Upon receiving the stored information, the stored information receiver 42 of the management server 40 stores the stored information in the stored information storage unit 46.

Figures 8, 9:
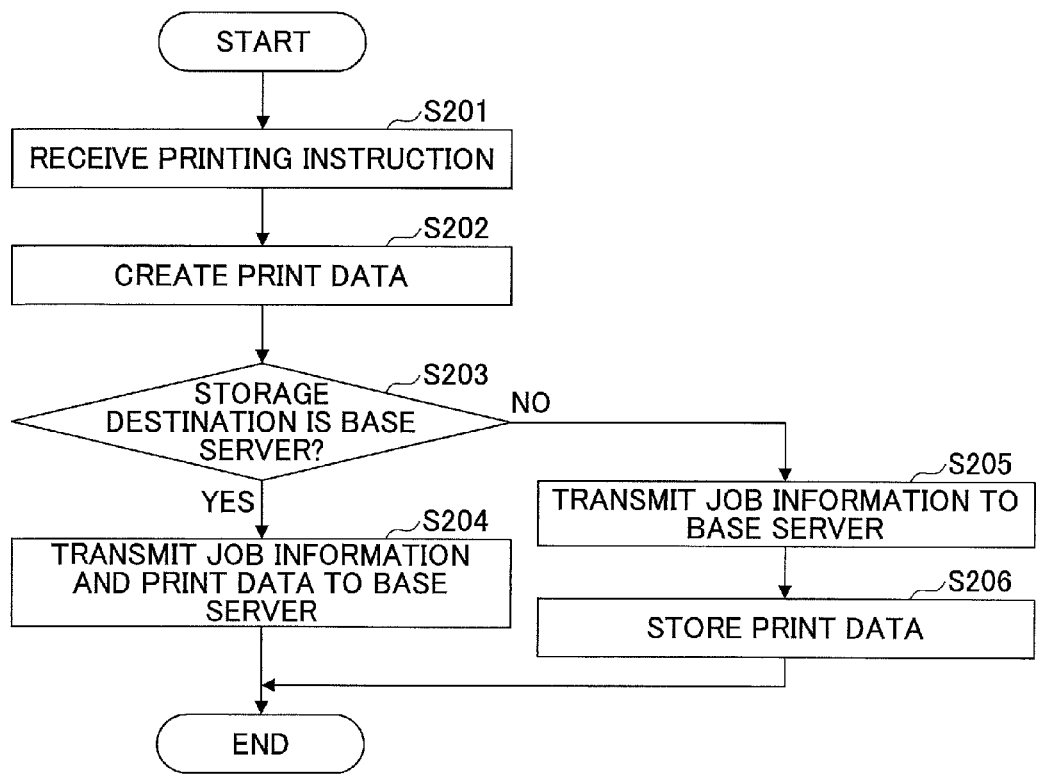
FIG. 8 is a diagram illustrating an example of a configuration of a saved-information storage unit.
FIG. 9 is a flowchart illustrating an example, in the embodiment, of a process to be executed by a client terminal in response to the printing instruction.

FIG. 8 is a diagram illustrating an example of a configuration of the stored information storage unit 46. As illustrated in FIG. 8, in the stored information storage unit 46, a user name corresponding to job information and a base server name of a base server 10 storing the job information are associated and stored.

Next, details of the process are described, which is executed by the client terminal 30 for steps S103 and S104.

FIG. 9 is a flowchart illustrating an example, in the embodiment, of a procedure to be executed by the client terminal 10 in response to the printing instruction.

At step S201, the print instruction receiver 33 receives a printing instruction from a user. In the printing instruction, document data to be printed and a storage destination of print data are specified, for example. The storage destination of the print data may be received, for example, through a screen for receiving a setting of a print attribute (printing condition).

Subsequently, the print data generator 34 generates print data for the document data that is specified as the printing target (S202).

Subsequently, the job information transmitter 35 determines whether the storage destination of the print data is the base server 10 (S203). In response to detecting that the storage destination of the print data is the base server 10 (Yes at S203), the job information transmitter 35 transmits, to the base server 10, the job information including the job name, the user name of the log-in user, and the generated print data (S204). The base server 10 that is the destination of transmitting the job information and so forth is specified based on the server information stored in the server information storage unit 37. Additionally, the job name is generated, for example, based on a file name of the document data to be printed.

Whereas, in response to detecting that the storage destination of the print data is the client terminal 30 (No at S203), the job information transmitter 35 transmits, to the base server 10, the job information including the job name, the user name of the log-in user, and the terminal name of the client terminal 30 (S205). Subsequently, the job information transmitter 35 associates the print data with the job name; and the job information transmitter 35 stores the print data and the associated job name in the client data storage unit 38 (S206).

Figure 10:
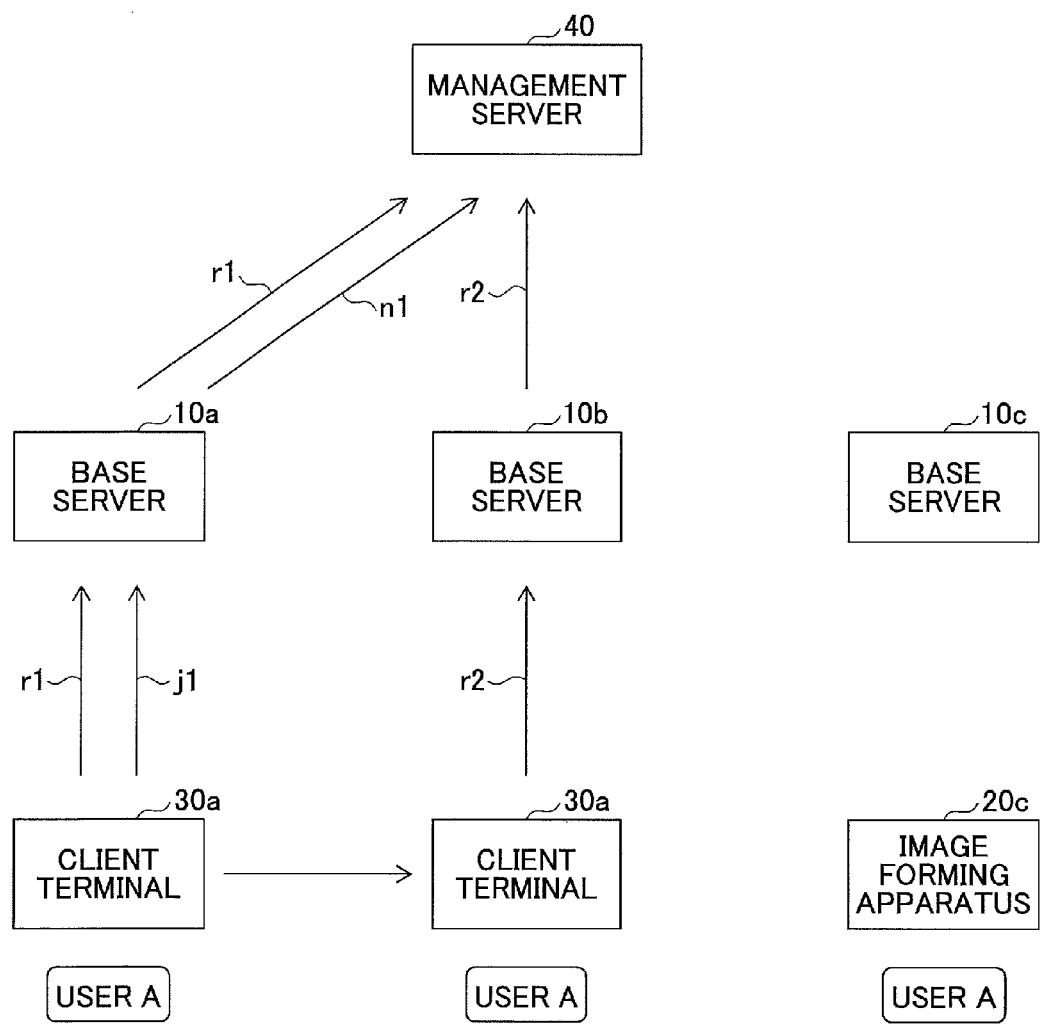
FIG. 10 is a diagram illustrating a situation which is expected in the description of the process to be executed during printing.

Next, a process to be executed during printing is described. Here, the situation illustrated in FIG. 10 is assumed. FIG. 10 is a diagram illustrating a situation, which is assumed for the description of the process to be executed during printing.

In FIG. 10, first, the client terminal 30a is connected to the network of the base A. Thus, the client terminal 30a executes the process described by referring to FIG. 4 at the base A. In FIG. 10, r1 corresponds to a registration request including the terminal name and the IP address of the client terminal 30a. Thus, at this point of time, the IP address that is associated with the terminal name of the client terminal 30a and that is assigned to the client terminal 30a at the base A is stored in the client information storage unit 45. Further, j1 corresponds to the job information. The job information is stored in the base server 10a. Here, it is assumed that the print data is stored in the client terminal 30a. Furthermore, n1 is the stored information that is transmitted in response to receiving the job information. Namely, the fact that the job information corresponding to the user A is stored in the base server 10a is registered in the management server 40.

Suppose that, subsequently, the user (the user A) of the client terminal 30a moves to the base B while carrying the client terminal 30a. At this time, the user A sets the server information of the base server 10b of the base B through the setting receiver 31a of the client terminal 30a. Thus, the server information of the base server 10b is stored in the server information storage unit 37a. Subsequently, the client terminal 30a connects to the network of the base B, and the client terminal 30a executes step S101 of FIG. 4. Namely, in FIG. 10, r2 corresponds to the registration request including the terminal name and the IP address of the client terminal 30a. Thus, at this point of time, the IP address that is associated with the terminal name of the client terminal 30a and that is assigned to the client terminal 30a at the base B is stored in the client information storage unit 45. Namely, the record that is stored in the client information storage unit 45 based on the registration request r1 is updated based on the registration request r2.

It is assumed that, subsequently, the user A moves to the base C in the state in which the client terminal 30a is connected to the network of the base B, and that the user A inputs a printing instruction to the image forming apparatus 20c of the base C.

Figure 11:
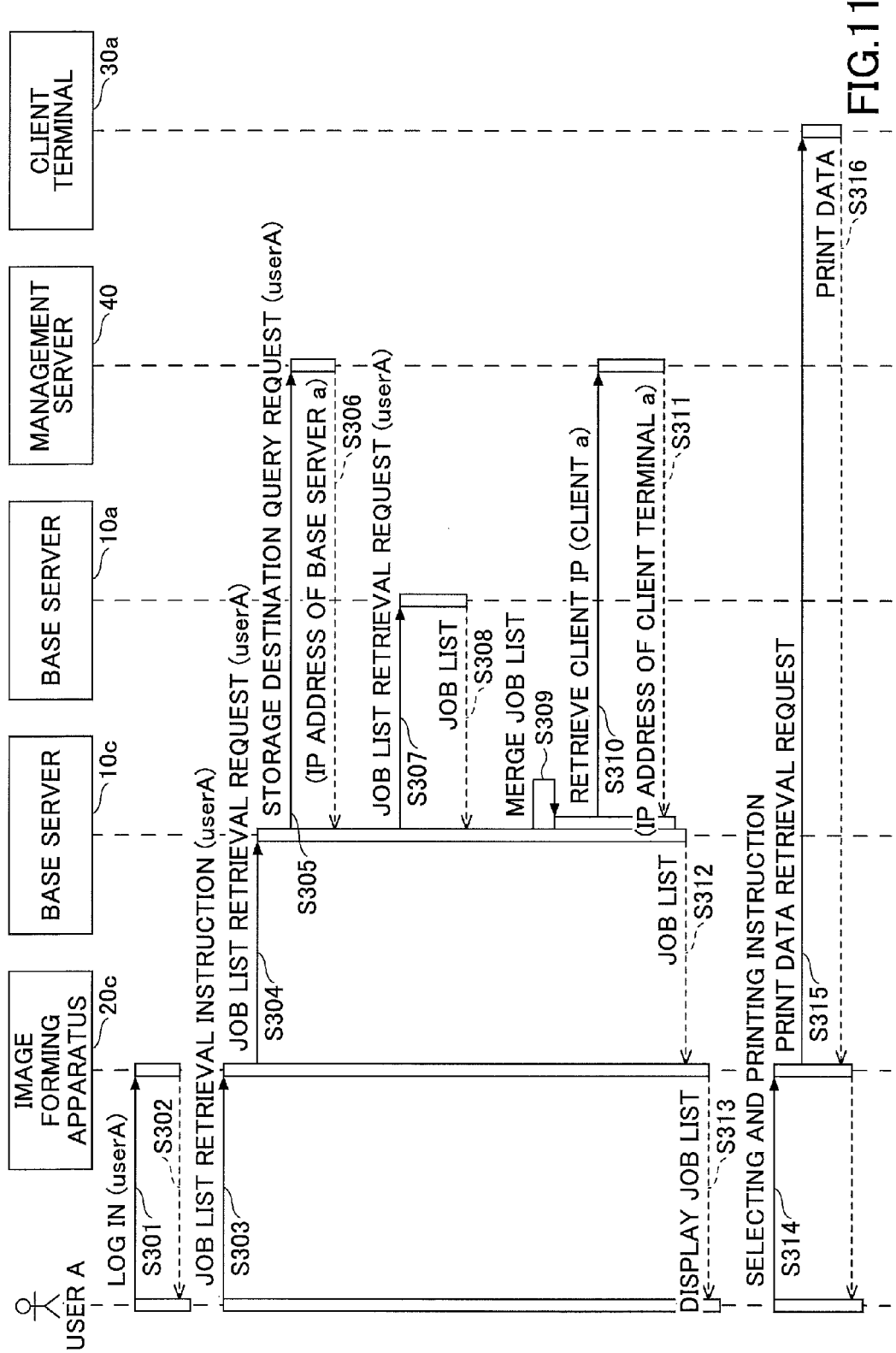
FIG. 11 is a sequence diagram illustrating an example, in the embodiment, of the process to be executed during printing.

FIG. 11 is a sequence diagram illustrating an example, in the embodiment, of a process to be executed during printing. Note that, in the description of FIG. 11, to the end of the symbol of each unit illustrated in FIG. 3, "a," "b," or "c" that is added to the end of the symbol of the specific device including the unit is added.

At step S301, the user A inputs a log-in request through a log-in screen, which is displayed on the operation panel of the image forming apparatus 20c. In the log-in request, for example, the user name of the user A (userA) and the password are input. Upon detecting, by the input controller 21c of the image forming apparatus 20c, the log-in request, the log-in controller 23c executes an authentication process for the user name and so forth, which are input together with the log-in request. Here, the authentication process may be executed based on a known method. In response to detecting that the authentication process is successful, the log-in controller 23c causes the image forming apparatus 20c to be available for the user A (S302). For example, the log-in screen is deleted, and a screen is displayed, which is for waiting for an input of a command for using a function of the image forming apparatus 20c.

Subsequently, upon detecting, by the input controller 21c, an input of a retrieval instruction for retrieving a job list (S303), the job list retrieval unit 24c transmits, to the base server 10c, the retrieval request for retrieving the job list (S304). The retrieval request includes the user name (userA) of the log-in user of the image forming apparatus 20c. Here, in the image forming apparatus 20c, the IP address and so forth of the base server 10c are set in advance.

In response to detecting that the retrieval request is received by the job list request receiver 124c of the base server 10c, the storage destination query unit 125c transmits, to the management server 40, a query request for querying the storage destination of the job information for the user corresponding to the retrieval request (S305). The query request includes the user name (userA), which is included in the retrieval request.

Upon receiving the query request, the storage destination response unit 43 of the management server 40 retrieves, from the stored information storage unit 46, the base server name associated with the user name, which is included in the query request. Based on the example of FIG. 10, the base server name of the base server 10a is retrieved. Note that, if the user A has input the printing instruction at base B, the base server name of the base server 10b is also retrieved. The storage destination response unit 43 retrieves the IP address corresponding to the retrieved base server name from the base server list storage unit 47.

FIG. 12 is a diagram illustrating an example of a configuration of the base server list storage unit 47. As illustrated in FIG. 12, in the base server list storage unit 47, for each base server 10, the base server name of the base server 10 and the IP address of the base server 10 are associated and stored.

The storage destination response unit 43 returns the IP address retrieved from the base server list storage unit 47 to the storage destination query unit 125 (S306). Note that, if, in each base server 10, an IP address of another base server 10 is associated with a base server name of the other base server 10, and the IP address and the associated base server name are stored, the base server name retrieved from the stored information storage unit 46 may be returned at step S306.

Upon receiving the IP address by the storage destination query unit 125c, the job information collecting unit 126c transmits a retrieval request for retrieving a job list to the base server 10a corresponding to the IP address (S307). In the retrieval request, the user name, which is included in the job list retrieval request received at step S304, is included. Note that, if a plurality of IP addresses is returned from the storage destination response unit 43, the retrieval request for retrieving the job list is transmitted for each IP address.

Upon receiving the retrieval request by the job list request receiver 124a of the base server 10a, the job list replay unit 127a retrieves, from the job information storage unit 131a, the job information including the user name, which is included in the retrieval request. Subsequently, the job list reply unit 127a returns the job list formed of the retrieved job information to the job information collecting unit 126c (S308).

Upon receiving the job lists from all destinations of the retrieval request for retrieving the job list (which is the base server 10a, in this case), the job information collecting unit 126c merges all the received job lists (S309). Namely, the job lists are merged to be a single job list. Subsequently, in response to detecting that the merged job list includes the job information of which the storage destination is specified by a terminal name of any of the client terminals 30, the job information collecting unit 126c transmits, to the management server 40, a retrieval request, which includes the terminal name of the job information, for retrieving an IP address (S310). The client information response unit 44 of the management server 40 retrieves the IP address that is associated with the terminal name included in the retrieval request and that is stored in the client information storage unit 45. The client information response unit 44 returns the IP address to the job information collecting unit 126c (S311). Here, in the example of FIG. 10, the IP address that is assigned to the client terminal 30a at the base B is returned.

Upon receiving the IP address corresponding to the terminal name, the job information collecting unit 126c adds, to each job information item included in the job list, the IP address corresponding to the storage destination of the job information item. For the job information of which the value of the storage destination is the base server name, the IP address corresponding to the base server name is added. The IP address is obtained at step S306. For the job information of which the value of the storage destination is the terminal name of the client terminal 30a, the IP address received at step S311 is added. Here, the IP address may be added to the job information by replacing the value of the storage destination of the job information with the IP address.

Subsequently, the job list reply unit 127c returns, to the image forming apparatus 20c, the job list in which the IP addresses are attached to the corresponding job information items (S312).

FIG. 13 is a diagram illustrating an example of the job list. In FIG. 13, the job list is illustrated that is formed of the job information items including "user A" as the user name, out of the job information items illustrated in FIG. 7. Additionally, to each job information item included in the job list, the IP address corresponding to the storage destination of the job information item is added.

Upon receiving the job list by the job list retrieval unit 24 of the image forming apparatus 20c, the display controller 22c displays the job list on the operation panel (S313).

The user A selects one or more job information items from the displayed job list, and the user A inputs an instruction to execute printing (S314). In response to detecting the instruction to execute printing by the input controller 21c, the data retrieval unit 25c transmits, to the IP address of the selected job information item, a retrieval request for retrieving the print data (S315). The retrieval request includes a job name of the job information item. For example, in response to detecting that the job information item is selected of which the storage destination is the IP address of the client terminal 30a, the retrieval request for retrieving the print data is transmitted to the client terminal 30a. Here, the IP address of the client terminal 30a which is included in the job information item is the IP address that is assigned to the client terminal 30a at the base B. Thus, the retrieval request is normally received by the client data manager 36 of the client terminal 30a, as long as there is no special condition, such as a communication failure.

Subsequently, the client data manager 36a retrieves the print data that is associated with the job name included in the retrieval request and that is stored in the client data storage unit 38a, and the client data manager 36a returns the print data to the data retrieval unit 25c (S316).

Upon receiving the print data by the data retrieval unit 25c, the job processor 26c executes the print job for the print data. As a result, a paper sheet is output on which the print data is printed.

Note that, if, at step S314, a job information item is selected of which the storage destination is the base server 10a, the data retrieval unit 25c transmits the retrieval request for retrieving the print data to the base server 10a. The retrieval request includes the job name of the job information item. The server data manager 128 of the base server 10a retrieves the print data that is associated with the job name included in the retrieval request and that is stored in the server data storage unit 132a, and the server data manager 128 of the base server 10a returns the print data to the data retrieval unit 25c.

As described above, in the embodiment, the current IP address of each client terminal 30 is associated with the terminal name of the client terminal 30, and the current IP address and the associated terminal name are stored in the management server 40. Additionally, the job information corresponding to the print data stored in the client terminal 30 includes the terminal name of the client terminal 30, which is the storage destination. Here, the terminal name is the static identification information that does not depend on the network to which the client terminal 30 is connected. Thus, even if the base server 10 that is the connection destination of the client terminal 30 is switched, and the IP address of the client terminal 30 is changed, the current IP address (destination information) of the client terminal 30 that is the storage destination of the print data corresponding to the job information item can be specified based on the terminal name included in the job information item. Consequently, each image forming apparatus 20 can obtain the print data from the client terminal 30 based on the IP address that is specified in this manner. Therefore, even if the destination information of the device (the client terminal 30) that is the storage destination of the print data is changed, the print data can be obtained from the storage destination.

In the embodiment, the example is described where the IP address is an example of the destination information of the client terminal 30. However, depending on the communication protocol to be used, destination information other than the IP address may be used.

Further, in the embodiment, the case is described where the print data is an example of data that is stored in the client terminal 30 or the base server 10. However, the embodiment may be applied to another type of data and a device other than the image forming apparatus 20, as long as the data can be stored in the storage device, and the data can be retrieved from the storage device and used. For example, the embodiment may be applied to a projector and image data to be projected by the projector.

Furthermore, the data to be stored in the client terminal 30 or the base server 10 may not be data to be output in some form by the device. For example, the data may be used in some form by the device (to be processed by some functions), or the data may be referenced by the device.

Next, another embodiment is described. In this embodiment, points that are different from the above-described embodiment are described. Thus, points that are not specifically mentioned in this embodiment can be the same as those of the above-described embodiment.

Figure 14:
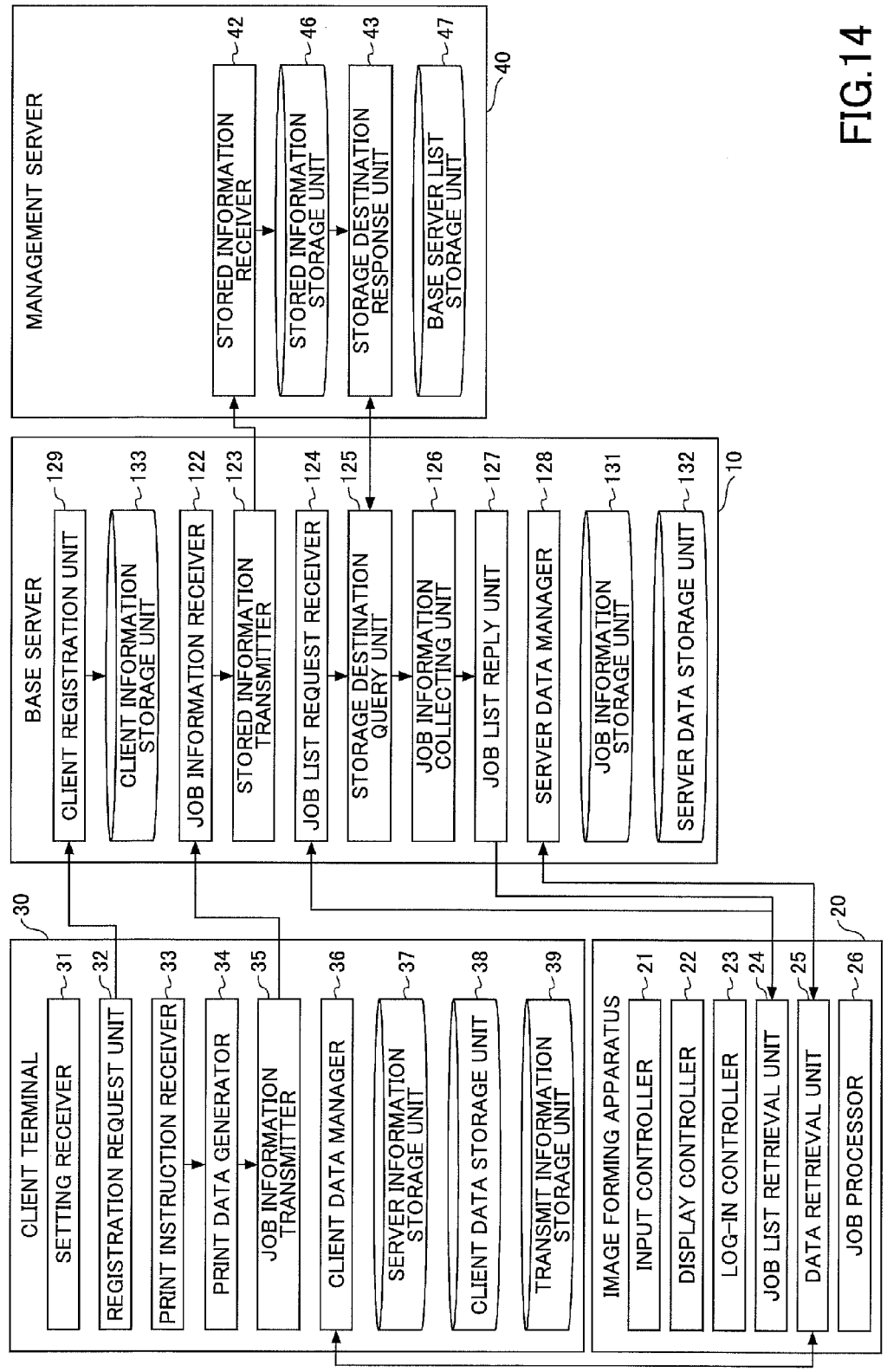
FIG. 14 is a diagram illustrating an example of a functional configuration of the printing system according to another embodiment.

FIG. 14 is a diagram illustrating an example of a functional configuration of the printing system according to the embodiment. In FIG. 14, the same reference numerals are attached to the parts that are the same as those of FIG. 3, and the description thereof is omitted. In FIG. 14, the client terminal 30 further includes a transmit information storage unit 39. The transmit information storage unit 39 can be implemented, for example, by using the auxiliary storage device of the client terminal 30.

The transmit information storage unit 39 stores, for each job information item, information for identifying the base server 10 that is the destination of the job information item. Namely, after transmitting the job information item, the job information transmitter 35 associates the job name of the job information item with the server information (IP address) of the base server 10 for the job information item; and the job information transmitter 35 stores the server information and the associated job name in the transmit information storage unit 39. Additionally, even if the storage destination of the print data is the base server 10, the job information transmitter 35 stores the print data in the client data storage unit 38. Alternatively, in this embodiment, only the client terminal 30 can be selected as the storage destination of the print data.

Whereas, the management server 40 does not include the client registration unit 41, the client information response unit 44, and the client information storage unit 45. In this embodiment, the correspondence between the terminal name and the IP address of the client terminal 30 is managed by the base server 10.

Thus, the base server 10 includes a client registration unit 129 instead of the registration request relay unit 121; and the base server 10 further includes a client information storage unit 39.

FIG. 15 is a flowchart illustrating an example, in the embodiment, of a process to be executed by a client terminal, in response to a printing instruction. In FIG. 15, the same step numbers are attached to steps that are the same as those of FIG. 9, and the description thereof is omitted.

In FIG. 15, even if the storage destination of the print data is the base server 10, step S206 is executed, so that the job name is associated with the print data, and the print data and the associated job name are stored in the client data storage unit 38.

Subsequently, the job information transmitter 35 associates the job name with the server information of the base server 10 that is the destination of the job information; and the job information transmitter 35 stores the server information and the associated job name in the transmit information storage unit 39 (S207). The server information of the base server 10 that is the destination of the job information is stored in the server information storage unit 37.

FIG. 16 is a diagram illustrating an example of a configuration of the transmit information storage unit 39. As illustrated in FIG. 16, the transmit information storage unit 39 stores, for each job information items, the job name of the job information item and the transmission destination address. The job name is the job name of the job information item. The transmission destination address is the server information of the base server 10 that is the destination of the job information item.

Next, a process is described, which is executed for a case where the client terminal 30a executes the process of FIG. 15 at base A in response to an instruction by the user A; and, subsequently, the user A moves to the base B while carrying the client terminal 30a.

Figure 17:
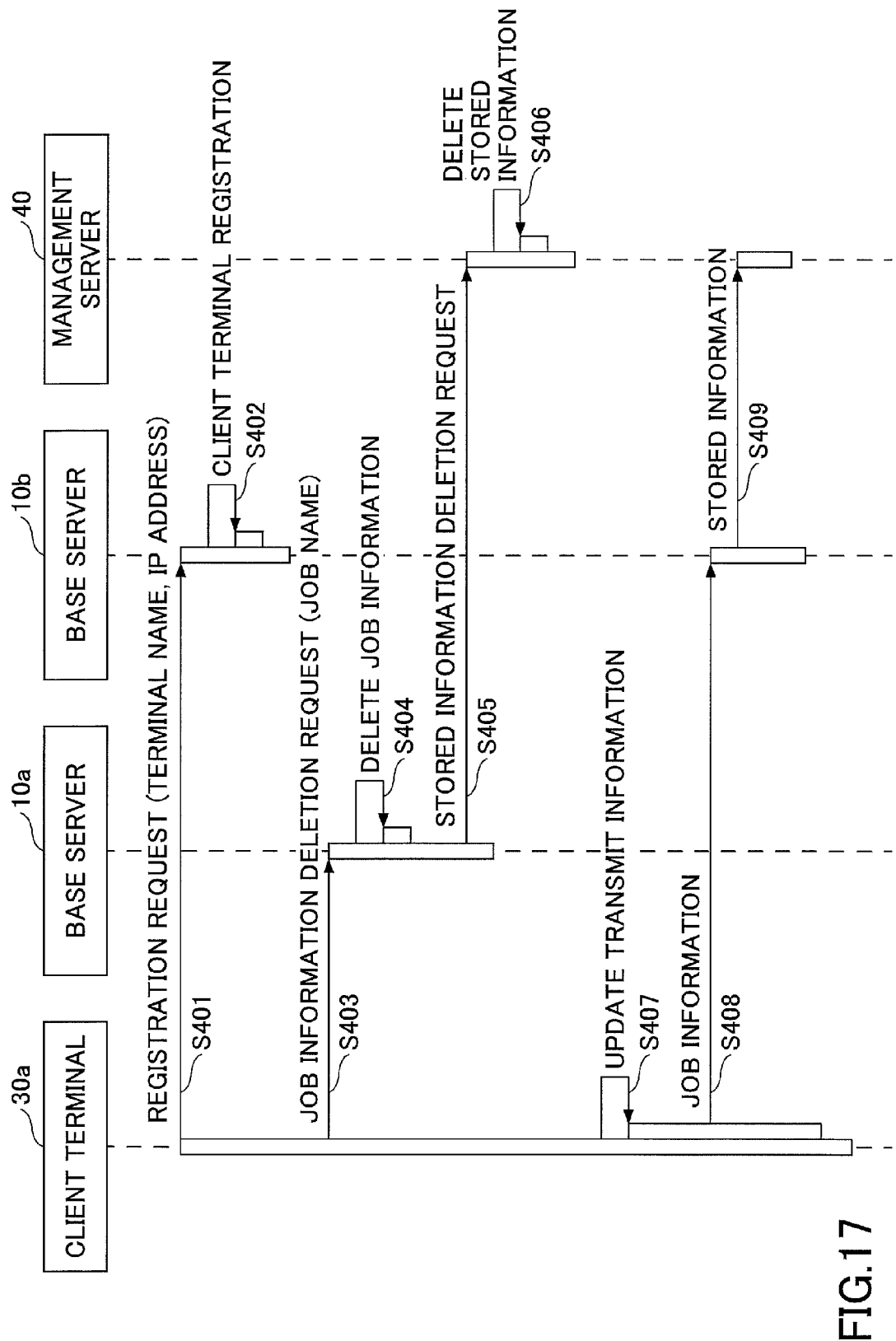
FIG. 17 is a sequence diagram illustrating an example, in the embodiment, of a process to be executed in response to detecting that a base to which the client terminal belongs is changed.

FIG. 17 is a sequence diagram illustrating an example, in the embodiment, of a process to be executed, upon the base to which the client terminal 30a belongs being switched.

First, the user A sets the server information of the base server 10b of the base B through the setting receiver 31a of the client terminal 30a. Thus, the server information storage unit 37a stores the server information of the base server 10b.

Subsequently, in response to updating of the server information stored in the server information storage unit 37a, the registration request unit 32a of the client terminal 30a automatically transmits a registration request including the terminal name and the IP address of the client terminal 30a to the base server 10b corresponding to the server information stored in the server information storage unit 37a; or, in response to an input of a registration instruction by the user A, the registration request unit 32a of the client terminal 30a transmits a registration request including the terminal name and the IP address of the client terminal 30a to the base server 10b corresponding to the server information stored in the server information storage unit 37a (S401). Upon receiving the registration request, the client registration unit 129b of the base server 10b associates the terminal name with the IP address, which are included in the registration request; and the client registration unit 129b of the base server 10b stores the terminal name and the associated IP address in the client information storage unit 133b (S402). An example of a configuration of the client information storage unit 133b may be the same as the configuration illustrated in FIG. 6, for example.

Note that, prior to executing the process of FIG. 15 at the base A for the first time, steps S401 and S402 are executed for the base server 10a. Namely, in this embodiment, step S102 of FIG. 4 may not be executed.

Subsequently, in response to detecting that the server information is updated, the job information transmitter 35b of the client terminal 30b searches for a record in which the server information other than the updated server information is stored as the transmission destination address from the transmit information storage unit 39. Here, a record is detected in which the server information of the base server 10a is stored as the transmission destination address. Then, based on the transmission destination address of the record, the job information transmitter 35b transmits a deletion request for deleting the job information to the base server 10a (S403). The deletion request includes the job name of the record.

Upon receiving the deletion request, the job information receiver 122a of the base server 10a deletes the job information corresponding to the job name included in the deletion request in the job information storage unit 131a (S404). At this time, if the storage destination of the print data corresponding to the job information is the base server 10a, the job information receiver 122a deletes the print data in the server data storage unit 132a.

Subsequently, the stored information transmitter 123a of the base server 10a transmits, to the management server 40, a deletion request, which includes the user name included in the deleted job information (which is "user A," in this case) and the base server name of the base server 10a, for deleting the stored information (S405). The reason is that the base server 10a no longer stores the job information for the user A.

Upon receiving the deletion request, the stored information receiver 42 of the management server 40 deletes, in the stored information storage unit 46, the stored information that includes the user name and the base server name, which are included in the deletion request (S406).

Subsequently, the job information transmitter 35a of the client terminal 30a updates, among the records of the transmit information storage unit 39a, the record in which the transmission destination address is other than the server information stored in the server information storage unit 37a, so that the transmission destination address of the record is replaced with the server information (S407). Here, the transmission destination address of the corresponding record is updated from the server information of the base server 10a to the server information of the base server 10b.

Subsequently, the job information transmitter 35a transmits, to the base server 10b, the job information including the job name of the record for which the transmission destination address is updated, the user name of the log-in user of the client terminal 30a (here, "userA"), and the terminal name of the client terminal 30a (S408). The job information receiver 122b of the base server 10b stores the job information in the job information storage unit 131 (FIG. 7). As a result, the job information stored in the base server 10a is moved to the base server 10b. Here, the terminal name of the client terminal 30a is stored as the storage destination.

Subsequently, the stored information transmitter 123b of the base server 10b transmits, to the management server 40, the stored information including the user name of the job information, and the base server name of the base server 10b (S409). Upon receiving the stored information, the stored information receiver 42 of the management server 40 stores the stored information in the stored information storage unit 46. Here, step S409 may be executed, if the job information is received such that the user name of the job information differs from user names of job information items stored in the job information storage unit 131 of the base server 10b.

Further, steps on and after step S407 may be executed in response to an instruction by the user. For example, in response to detecting that there is a record, in the records of the transmit information storage unit 39a, for which the transmission destination address is other than the server information stored in the server information storage unit 37a, the job information transmitter 35a of the client terminal 30a displays the job name of the record, so as to query the user whether the job information corresponding to the job name is to be transmitted. If the user inputs a command to transmit the job information, steps on and after step S407 may be executed.

Additionally, transmission of the deletion request to the base server 10a (S403) and transmission of the job information to the base server 10b (S408) may be executed simultaneously or in parallel, in response to detecting that the server information stored in the server information storage unit 37a is updated. Namely, in response to a single instruction (setting of the server information) by a user, transmission of the deletion request for deleting the job information to the base server 10a (S403) and transmission of the job information to the base server 10b (S408) may be simultaneously executed.

As it is clear from the above-described process, in this embodiment, the job information that is registered in a base server 10 from a client terminal 30 is moved, as the base of the client terminal 30 is switched.

Suppose that, subsequently, the user A moves to the base C in the state in which the client terminal 30a is connected to the network of the base B, and the user A inputs a printing instruction to the image forming apparatus 20c of the base C.

Figure 18:
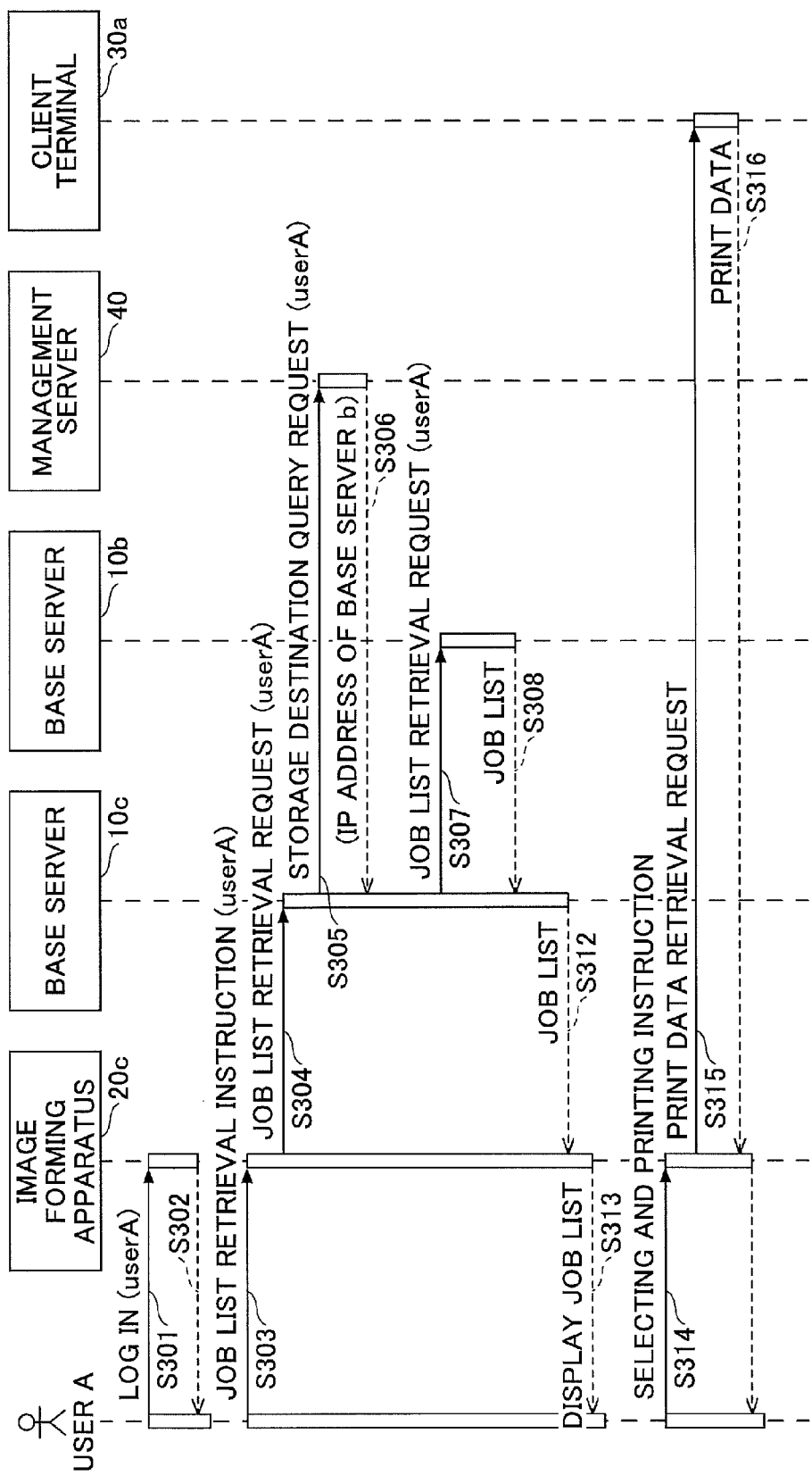
FIG. 18 is a sequence diagram illustrating an example, in the embodiment, of a process to be executed during printing.

FIG. 18 is a sequence diagram illustrating an example, in the embodiment, of a process to be executed during printing. In FIG. 18, the same step numbers are attached to steps that are the same as those of FIG. 11, and the description is omitted accordingly.

In FIG. 18, in response to a query request for the storage destination of the job information of the user A (S405), the storage destination response unit 43 of the management server 40 returns the IP address of the base server 10b (S406). The reason is that, at S409 of FIG. 17, the base server name in the stored information including the user A is updated to be the base server name of the base server 10b.

Thus, steps S307 and S308 are executed for the base server 10b. At this time, the job list reply unit 127b of the base server 10b adds, to each job information included in the job list to be returned, the IP address that is associated with the terminal name of the job information item and stored in the client information storage unit 133b. Here, the IP address of the client terminal 30a at the base B is added to the job information for the user A.

Thus, in the embodiment, steps S310 and S311 of FIG. 11 may not be executed. Additionally, if the client terminal 30 to be used by each user is fixed to be a single terminal, the job list may not be merged (S309). The reason is that, in the embodiment, the job information of a user is collected in the base server 10 of the base to which the user's client terminal 30 belongs.

Steps on and after step S312 are the same as corresponding steps of FIG. 11.

As described above, in this embodiment, an effect that is the same as the effect of the above-described embodiment can be obtained.

In the above-described embodiments, the printing system 1 is an example of the information processing system. The base server 10 is an example of a first information processing device. The management server 40 is an example of a second information processing device. The client terminal 30 is an example of a terminal. The image forming apparatus 20 is an example of a data retrieval device. The registration request relay unit 121 or the client registration unit 129 is an example of a first registration unit. The client information storage unit 45 or the client information storage unit 133 is an example of a first storage unit. The job information receiver 122 is an example of a receiver and a deletion unit. The job information storage unit 131 is an example of a second storage unit. The job information collecting unit 126 is an example of a retrieval unit. The job list reply unit 127 is an example of a transmitter. The stored information transmitter 123 is an example of a second registration unit and a deletion request unit.

The information processing system, the information processing device, and the information processing method are described by the above-described embodiments. However, the information processing system, the information processing device, and the information processing method according to the present invention are not limited to the above-described embodiments, and various modifications and improvements may be made within the scope of the present invention. Specific examples of numerical values are used in order to facilitate understanding of the invention. However, these numerical values are simply illustrative, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processing unit in a functional block does not necessarily correspond to a boundary of a physical component. An operation by a plurality of functional units may be physically executed by a single component. Alternatively, an operation by a single functional unit may be physically executed by a plurality of components. For the convenience of explanation, the devices according to the embodiment of the present invention are explained by using the functional block diagrams. However, these devices may be implemented in hardware, software, or combinations thereof. The software that operates in accordance with the present invention may be prepared in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

The present application is based on and claims the benefit of priority of Japanese Priority Application No. 2015-124550 filed on Jun. 22, 2015, and Japanese Priority Application No. 2016-065555 filed on Mar. 29, 2016, the entire contents of which are hereby incorporated herein by reference.

What is claimed is:

1. An information processing system comprising:
a plurality of first information processing devices; and
a second information processing device that is connected to the plurality of the first information processing devices through a first network, wherein each of the plurality of first information processing devices includes
a first registration unit configured to store, in a first storage unit, an identifier of a terminal and destination information of the terminal while associating the identifier with the destination information, the identifier and the destination information being transmitted from the terminal that is connected to the first information processing device through the network;
a receiver configured to receive, from the terminal, information including data identification information of data stored in the terminal, the identifier of the terminal, and user identification information of a user of the terminal;
a second storage unit configured to store the information received by the receiver;
a second registration unit configured to store, in the second information processing device, the user identification information received by the receiver and first information processing device identification information of the first information processing device, while associating the user identification information with the first information processing device identification information;
a retrieval unit configured to retrieve, in response to a request from a data retrieval device, the information including the user identification information of the user from the second storage unit of the first information processing device corresponding to the first information processing device identification information that is stored in the second information processing device while associated with the user identification information of the user of the data retrieval device; and
a transmitter configured to transmit, for each of the retrieved information, the destination information stored in the first storage unit, the destination information being associated with the identifier included in the information, and the data identification information included in the information to the data retrieval device, and
wherein the data retrieval device is configured to retrieve the data based on the destination information.

2. The information processing system according to claim 1, wherein the identifier of the terminal is invariant regardless of the first information processing device to which the terminal is connected, and
wherein the destination information of the terminal is changed depending on the first information processing device to which the terminal is connected.

3. The information processing system according to claim 1, wherein the first information processing device includes
a deletion unit configured to delete, in the information stored in the second storage unit, transmit information to be transmitted by the terminal to another first information processing device; and
a deletion request unit configured to transmit, to the second information processing device, a deletion request for deleting the association between the user identification information and the first information processing device identification information, the user identification information and the first information processing device identification information being included in the transmit information deleted by the deletion unit.

4. A first information processing device of a plurality of first information processing devices connected to a second information processing device through a network, the first information processing device comprising:

a first registration unit configured to store, in a first storage unit, an identifier of a terminal and destination information of the terminal while associating the identifier with the destination information, the identifier and the destination information being transmitted from the terminal that is connected to the first information processing device through the network;
a receiver configured to receive, from the terminal, information including data identification information of data stored in the terminal, the identifier of the terminal, and user identification information of a user of the terminal;
a second storage unit configured to store the information received by the receiver;
a second registration unit configured to store, in the second information processing device, the user identification information received by the receiver and first information processing device identification information of the first information processing device, while associating the user identification information with the first information processing device identification information;
a retrieval unit configured to retrieve, in response to a request from a data retrieval device, the information including the user identification information of the user from the second storage unit of the first information processing device corresponding to the first information processing device identification information that is stored in the second information processing device while associated with the user identification information of the user of the data retrieval device; and
a transmitter configured to transmit, for each of the retrieved information, the destination information stored in the first storage unit, the destination information being associated with the identifier included in the information, and the data identification information included in the information to the data retrieval device,
wherein the data retrieval device is configured to retrieve the data based on the destination information.

5. The first information processing device according to claim 4, wherein the identifier of the terminal is invariant regardless of the first information processing device to which the terminal is connected, and
wherein the destination information of the terminal is changed depending on the first information processing device to which the terminal is connected.

6. The first information processing device according to claim 4, further comprising:
a deletion unit configured to delete, in the information stored in the second storage unit, transmit information to be transmitted by the terminal to another first information processing device; and
a deletion request unit configured to transmit, to the second information processing device, a deletion request for deleting the association between the user identification information and the first information processing device identification information, the user identification information and the first information processing device identification information being included in the transmit information deleted by the deletion unit.

7. An information processing method to be executed by a first information processing device of a plurality of first information processing devices connected to a second information processing device through a network, the information processing method comprising:
a first registration process of storing, in a first storage unit, an identifier of a terminal and destination information of the terminal while associating the identifier with the destination information, the identifier and the destination information being transmitted from the terminal that is connected to the first information processing device through the network;

a receiving process of receiving, from the terminal, information including data identification information of data stored in the terminal, the identifier of the terminal, and user identification information of a user of the terminal;

a storing process of storing, in a second storage unit, the information received by the receiving process;

a second registration process of storing, in the second information processing device, the user identification information received by the receiving process and first information processing device identification information of the first information processing device, while associating the user identification information with the first information processing device identification information;

a retrieval process of retrieving, in response to a request from a data retrieval device, the information including the user identification information of the user from the second storage unit of the first information processing device corresponding to the first information processing device identification information that is stored in the second information processing device while associated with the user identification information of the user of the data retrieval device; and a transmit process of transmitting, for each of the retrieved information, the destination information stored in the first storage unit, the destination information being associated with the identifier included in the information, and the data identification information included in the information to the data retrieval device, and wherein the data retrieval device retrieves the data based on the destination information.

8. The information processing method according to claim 7, wherein the identifier of the terminal is invariant regardless of the first information processing device to which the terminal is connected, and wherein the destination information of the terminal is changed depending on the first information processing device to which the terminal is connected.

9. The information processing method according to claim 7, further comprising:

a deletion process of deleting, in the information stored in the second storage unit, transmit information to be transmitted by the terminal to another first information processing device; and a deletion request process of transmitting, to the second information processing device, a deletion request for deleting the association between the user identification information and the first information processing device identification information, the user identification information and the first information processing device identification information being included in the transmit information deleted by the deletion process.

* * * * *